United States Patent
Aonuma et al.

(10) Patent No.: US 11,668,358 B2
(45) Date of Patent: Jun. 6, 2023

(54) VEHICLE DISC BRAKE

(71) Applicants: NISSIN KOGYO CO., LTD., Tomi (JP); HONDA MOTOR CO., LTD., Tokyo (JP)

(72) Inventors: Toru Aonuma, Tomi (JP); Kazumasa Uehara, Tomi (JP); Yoshiyuki Imai, Wako (JP); Chihiro Iida, Wako (JP)

(73) Assignees: NISSIN KOGYO CO., LTD., Tomi (JP); HONDA MOTOR CO., LTD., Tokyo (JP)

( * ) Notice: Subject to any disclaimer, the term of this patent is extended or adjusted under 35 U.S.C. 154(b) by 7 days.

(21) Appl. No.: 17/384,028

(22) Filed: Jul. 23, 2021

(65) Prior Publication Data

US 2021/0348660 A1    Nov. 11, 2021

Related U.S. Application Data

(62) Division of application No. 15/538,997, filed as application No. PCT/JP2015/084933 on Dec. 14, 2015, now Pat. No. 11,098,772.

(30) Foreign Application Priority Data

Dec. 25, 2014  (JP) ................................ 2014-261903
Oct. 28, 2015  (JP) ................................ 2015-211664

(51) Int. Cl.
*F16D 55/228* (2006.01)
*F16D 65/095* (2006.01)
(Continued)

(52) U.S. Cl.
CPC ........ *F16D 55/228* (2013.01); *F16D 65/0043* (2013.01); *F16D 65/0068* (2013.01); *F16D 65/092* (2013.01); *F16D 65/095* (2013.01)

(58) Field of Classification Search
CPC .. F16D 55/228; F16D 65/095; F16D 65/0043; F16D 65/092; F16D 65/0068
See application file for complete search history.

(56) References Cited

U.S. PATENT DOCUMENTS

| | | | |
|---|---|---|---|
| 4,162,721 A | 7/1979 | Moriya | |
| 11,098,772 B2 * | 8/2021 | Aonuma | ............... F16D 55/228 |

(Continued)

FOREIGN PATENT DOCUMENTS

| | | |
|---|---|---|
| DE | 19652936 A1 | 6/1998 |
| EP | 1234994 A2 | 8/2002 |

(Continued)

OTHER PUBLICATIONS

International Search Report dated Feb. 2, 2016, issued in counterpart application No. PCT/JP2015/084933. (2 pages).

(Continued)

*Primary Examiner* — Pamela Rodriguez
(74) *Attorney, Agent, or Firm* — WHDA, LLP

(57) ABSTRACT

The present invention is a vehicle disc brake for which incorrect installation of a friction pad can be prevented with a simple structure. The disc brake is provided with incorrect installation-preventing parts with which, if a friction pad (4) is installed with an incorrect installation orientation when a pair of tabs (10, 11) provided on the disc entry-side and disc exit-side of the back plate (4d) of a friction pad (4) is installed into pad guide grooves (9) formed on a caliper body (3), the tabs bump into the caliper body (3) and prevent the incorrect installation. The incorrect installation-preventing parts are formed from caliper-side recesses (9d, 9e), which are formed in the pad guide grooves (9) towards the center of the caliper body, and tab-side protrusions (10a, 11a), which have shapes that correspond to the caliper-side recesses (9d, 9e).

1 Claim, 13 Drawing Sheets

(51) Int. Cl.
*F16D 65/092* (2006.01)
*F16D 65/00* (2006.01)

(56) References Cited

U.S. PATENT DOCUMENTS

| | | |
|---|---|---|
| 2007/0240946 A1 | 10/2007 | Schorn et al. |
| 2009/0014262 A1 | 1/2009 | Camilo-Martinez et al. |
| 2010/0243385 A1 | 9/2010 | Kaneko et al. |
| 2012/0043168 A1 | 2/2012 | Narayanan V et al. |
| 2016/0040735 A1 | 2/2016 | Plantan et al. |

FOREIGN PATENT DOCUMENTS

| | | |
|---|---|---|
| GB | 2163500 A | 2/1986 |
| JP | 53-109073 A | 9/1978 |
| JP | 7-77229 A | 3/1995 |
| JP | 2008-2572 A | 1/2008 |
| JP | 2009-524781 A | 7/2009 |
| JP | 2014-74500 A | 4/2014 |
| WO | 2005/012754 A1 | 2/2005 |
| WO | 2014/143752 A1 | 9/2014 |

OTHER PUBLICATIONS

Extended (supplementary) European Search Report dated Aug. 9, 2018, issued in counterpart European Application No. 15872788.3. (7 pages).
Office Action dated Jul. 24, 2018, issued in counterpart Japanese Application No. 2016-566126, with English machine translation. (6 pages).
Office Action dated Dec. 17, 2018, issued in counterpart Taiwanese Application No. 104143186, with English translation of the Search Report. (7 pages).
Office Action dated Nov. 21, 2019, issued in counterpart EP Application No. 15 872 788.3 (4 pages).
Office Action dated Jun. 3, 2020, issued in counterpart IN Application No. 201717021772, with English translation(6 pages).

* cited by examiner

US 11,668,358 B2

VEHICLE DISC BRAKE

This application is a divisional application of U.S. application Ser. No. 15/538,997, filed on Jun. 22, 2017, now U.S. Pat. No. 11,098,772, which is a National Stage of International Application No. PCT/JP2015/084933, filed on Dec. 14, 2015 and claims priority to Japanese Patent Applications No. 2014-261903 filed on Dec. 25, 2014 and No. 2015-211664 filed on Oct. 28, 2015, the disclosure of which are hereby incorporated by reference.

TECHNICAL FIELD

The present invention relates to a vehicle disc brake and, more particularly, to a vehicle disc brake in which a pair of tabs provided on friction pads are housed in pad guide grooves formed in a caliper body and the friction pads are supported movably in a disc axial direction.

BACKGROUND ART

Conventionally, there is a vehicle disc brake that has a caliper body provided with acting parts having cylinder holes opened toward a disc rotor and a pair of friction pads disposed on both sides of the disc rotor, in which each of the friction pads has a pair of tabs on the disc entry side and the disc exit side of the back plates of the friction pads in forward travel of the vehicle and the friction pads are supported movably in a disc axial direction by housing the tabs in pad guide grooves formed in a caliper body (see, for example, PTL 1).

CITATION LIST

Patent Literature

PTL 1: JP-A-2014-74500

SUMMARY OF INVENTION

Technical Problem

Although FIG. 8 of PTL 1 above illustrates the installation of a friction pad (brake pad 80) in a caliper body 72, the friction pad can also be installed in the caliper body with the friction pad reversed, possibly causing so-called incorrect installation. FIG. 11 easily illustrates the problem with incorrect installation. As is clear from the disc brake illustrated in FIG. 11, even in the state in which the disc outer circumferential side and the disc inner circumferential side of a friction pad 61 are reversed, tabs 62 and 62 of the friction pad 61 can be inserted into pad guide grooves 64 and 64 provided in a caliper body 63, as illustrated in dashed lines.

An object of the invention is to provide a vehicle disc brake capable of preventing the incorrect installation of friction pads using a simple structure.

Solution to Problem

To achieve the above object, the vehicle disc brake according to the invention includes a caliper body provided with an acting part having a cylinder hole open toward a disc rotor and a pair of friction pads disposed on both sides of the disc rotor, each of the friction pads having a pair of tabs on a disc entry side and a disc exit side in forward travel of a vehicle, the friction pads being supported movably in a disc axial direction by housing the tabs in pad guide grooves formed in a caliper body, in which an incorrect installation preventing part is provided so as to prevent incorrect installation by bumping against the caliper body or the tabs when the friction pads are installed in the pad guide grooves in an incorrect orientation.

In addition, preferably, the incorrect installation preventing part is formed by a caliper side recess or a caliper side protrusion formed in each of the pad guide grooves and a tab side protrusion having a shape corresponding to the caliper side recess or a tab side recess having a shape corresponding to the caliper side protrusion formed in each of the tabs and, when the friction pads are installed in the incorrect orientation, the caliper side protrusion bumps against the tab or the tab side protrusion bumps against the pad guide groove.

In addition, preferably, the incorrect installation preventing part is formed by a protrusion protruding in a disc rotor circumferential direction, the protrusion being provided in a disc radial direction inner side end of the disc exit side surface or the disc entry side surface of each of the friction pads in forward travel of the vehicle, and the protrusion bumps against the caliper body when the friction pads are installed in the incorrect orientation.

In addition, preferably, the incorrect installation preventing part is formed by a pair of protrusions protruding in a disc rotor circumferential direction, the protrusions being provided in the disc radial direction inner side end of the disc exit side surface or the disc entry side surface of each of the friction pads in forward travel of the vehicle, and the protrusions bump against the caliper body when the friction pads are installed in the incorrect orientation.

In addition, preferably, the vehicle disc brake includes a caliper body provided with an acting part having a cylinder hole open toward a disc rotor, the acting part having a torque reception part making contact with a disc exit side surface or a disc entry side surface of each of the friction pads in forward travel of a vehicle and receiving a braking torque, pad guide grooves are provided in an intermediate part in a disc radial direction of the torque reception part and a pair of friction pads disposed on both sides of the disc rotor, each of the friction pads having a pair of tabs on a disc entry side and a disc exit side of a back plate in forward travel of the vehicle, the friction pads being supported movably in a disc axial direction by housing the tabs in pad guide grooves, in which the friction pads are formed to have different widths from the disc exit side surface to the disc entry side surface of the back plate in forward travel of the vehicle between an outer side and an inner side in the disc radial direction of the tabs, the torque reception part is formed to have different lengths between the torque reception parts facing each other across the friction pads so as to correspond to the shape of the back plate between the outer side and the inner side in the disc radial direction of the pad guide grooves, and the back plate bumps against the caliper body when the friction pads are installed in an incorrect orientation.

In addition, preferably, the vehicle disc brake includes a caliper body provided with an acting part having a cylinder hole open toward a disc rotor and a bridge part straddling an outer circumference of the disc rotor, the acting part having a torque reception part making contact with a disc exit side surface or a disc entry side surface of each of the friction pads in forward travel of a vehicle and receiving a braking torque, pad guide grooves are provided in an intermediate part in a disc radial direction of the torque reception part and a pair of friction pads disposed on both sides of the disc rotor, each of the friction pads having a pair of tabs on a disc entry side and a disc exit side of a back plate in forward travel of the vehicle, the friction pads being supported movably in a disc axial direction by housing the tabs in pad guide grooves, in which, when the friction pads are installed with a disc inner circumferential side and a disc outer circumferential side reversed by mistake, the tab are formed on the outer side in the disc radial direction of the back plate and the pad guide grooves are formed on the outer side in the disc radial direction of the torque reception part so that the disc inner circumferential side of the friction pads bumps against an inner surface of the bridge part.

Advantageous Effects of Invention

In the vehicle disc brake according to the invention, if the friction pads are installed in the caliper body in an incorrect orientation, the tabs of the friction pads cannot be inserted into the pad guide grooves due to a bump against the incorrect installation preventing part, thereby preventing incorrect installation.

In addition, the incorrect installation preventing part is formed by the caliper side recesses or the caliper side protrusions formed in the pad guide grooves and the tab side protrusions or the tab side recesses, formed in the tabs, that have shapes corresponding to the caliper side recesses or the caliper side protrusions. Accordingly, when the friction pads are installed in the correct state, the friction pads can be installed to the caliper body by inserting the tab side protrusions into the caliper side recesses or inserting the caliper side protrusions into the tab side recesses and inserting the tabs of the friction pads into the pad guide grooves. In contrast, when an attempt is made to install the friction pads with the disc outer circumferential side and the disc inner circumferential side reversed by mistake, the caliper side protrusions bump against the tabs or the tab side protrusions bump against the pad guide grooves and the tabs cannot be inserted into the pad guide grooves, thereby preventing the incorrect installation of the friction pads.

In addition, since the incorrect installation preventing part is formed by the protrusion, protruding in the disc rotor circumferential direction, that is provided at the disc radial direction inner side end of the disc exit side surface or the disc entry side surface of the friction pads in forward travel of the vehicle, the protrusions formed on the friction pads are disposed closer to the disc entry side than the caliper body when the friction pads are installed in the correct state and the friction pads can be installed to the caliper body without bumping against the caliper body. In contrast, when an attempt is made to install the friction pads with the disc outer circumferential side and the disc inner circumferential side reversed by mistake, the protrusions bump against the caliper body and the friction pads cannot be installed to the caliper body, thereby preventing incorrect installation.

In addition, since the incorrect installation preventing part is formed by a pair of protrusions, protruding in the disc rotor circumferential direction, that is provided at the disc radial direction inner side end of the disc exit side surface and the disc entry side surface in forward travel of a vehicle, the protrusions formed on the friction pads are disposed closer to the disc entry side than the caliper body when the friction pads are installed in the correct state, so the friction pads can be installed to the caliper body without bumping against the caliper body. In contrast, when an attempt is made to install the friction pads with the disc outer circumferential side and the disc inner circumferential side reversed by mistake, the pair of protrusions bump against the caliper body and the friction pads cannot be installed to the caliper body, thereby preventing incorrect installation. In addition, since the protrusions are provided in two positions (the disc exit side surface and the disc entry side surface), even when an attempt is made to insert the tabs into the pad guide grooves in the state in which the disc outer circumferential side and the disc inner circumferential side of the friction pads are reversed and the tabs are inclined obliquely with respect to the caliper body, any of the protrusions bumps against the caliper body and incorrect installation can be surely prevented. In addition, since the amount of exposure from the caliper body can be reduced by reducing the height of the protrusions, the appearance can be kept good by making the protrusions inconspicuous.

In addition, in back plates of the friction pads, the width between the disc exit side surface and the disc entry side surface in forward travel of the vehicle is different between the outer side in the disc radial direction of the tabs and the inner side in the disc radial direction of the tabs, the pad guide grooves are provided in an intermediate part in the disc radial direction of the torque reception parts, and the length between the torque reception parts facing each other across friction pads is different between the outer side in the disc radial direction of the pad guide grooves and the inner side in the disc radial direction of the pad guide grooves, so the friction pads can be installed appropriately because the shapes of the torque reception parts correspond to the shapes of the back plates of the friction pads when the friction pads are installed in the correct state. In contrast, when an attempt is made to install the friction pads with the disc outer circumferential side and the disc inner circumferential side reversed by mistake, the part having a large width from the disc exit side surface to the disc entry side surface of the back plate makes contact with the caliper body in the part having a small length between the torque reception parts facing each other across the friction pad and the friction pads cannot be installed to the caliper body, thereby preventing incorrect installation.

In addition, the tabs are formed on the outer side in the disc radial direction of the back plate and the pad guide grooves are formed on the outer side in the disc radial direction of the torque reception part so that the disc inner circumferential side of the friction pad bumps against the bridge part of the caliper body when the friction pads are installed with the disc outer circumferential side and the disc inner circumferential side reversed by mistake, so the appearance can be kept good while preventing incorrect installation with a simple structure.

DESCRIPTION OF EMBODIMENTS

Figure 1:
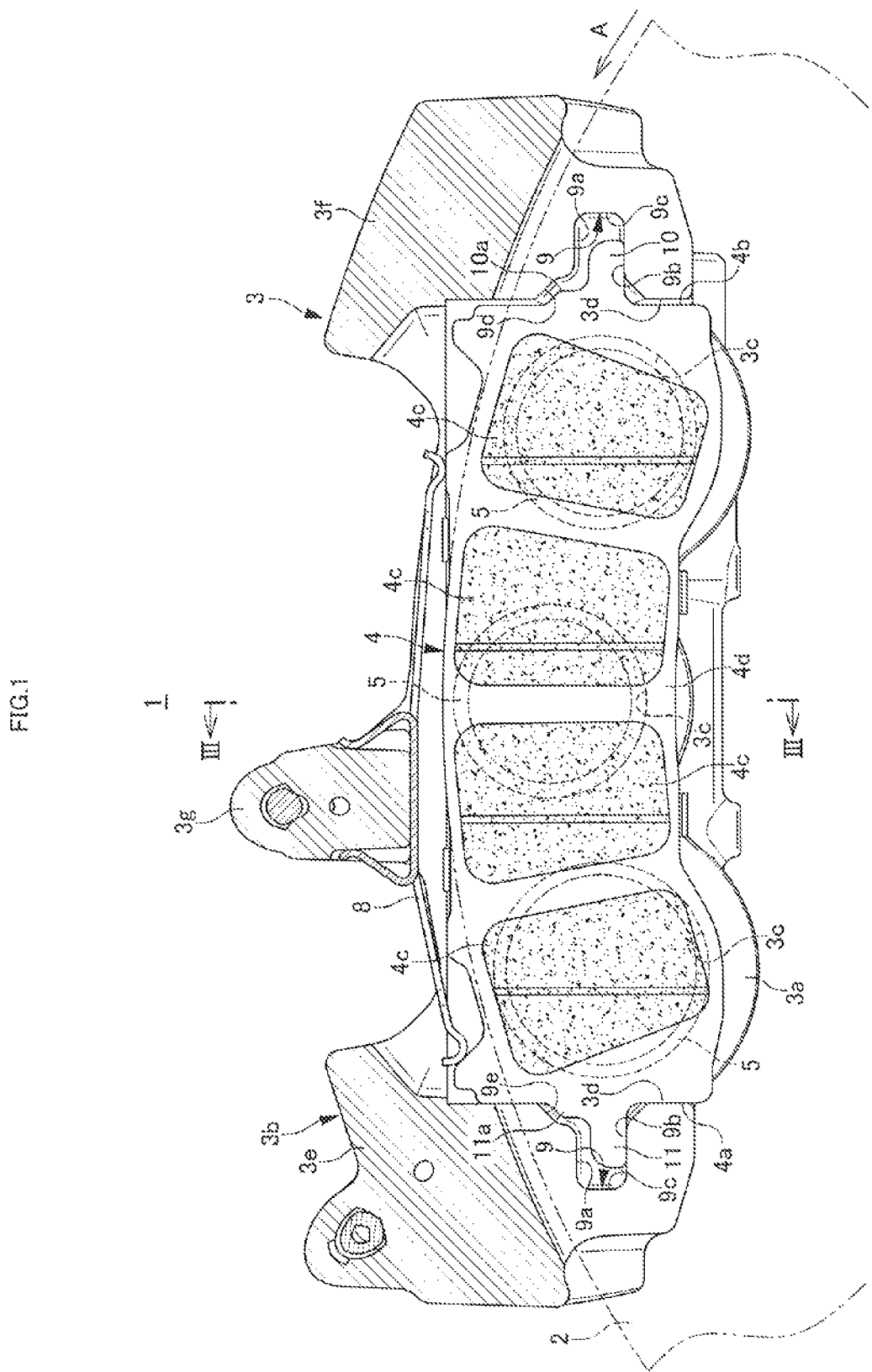
FIG. 1 is a cross sectional view illustrating the front of a vehicle disc brake according to a first embodiment of the invention.
Figure 2:
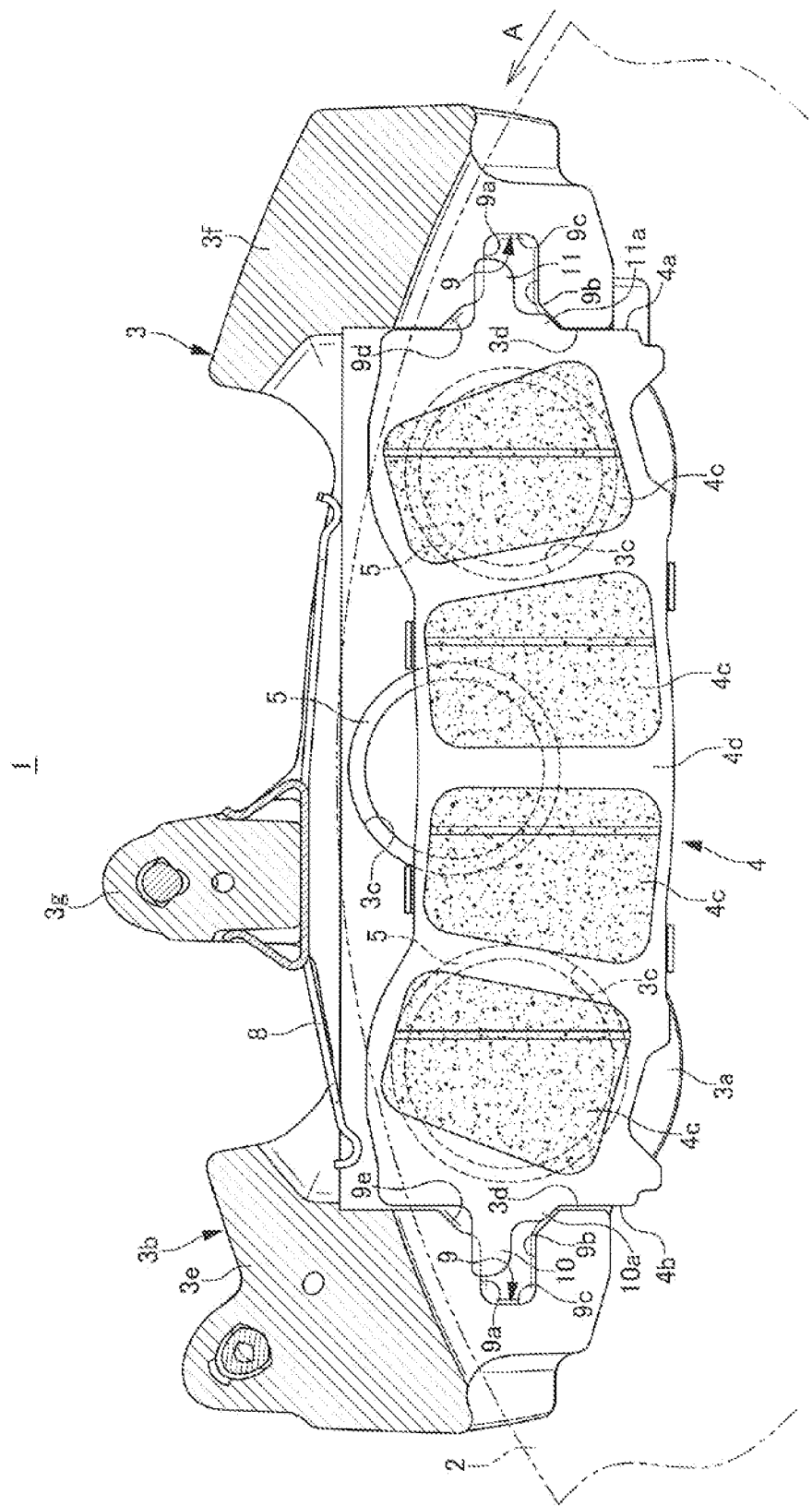
FIG. 2 is an explanatory diagram illustrating a case in which an attempt is made to install a friction pad with a disc outer circumferential side and a disc inner circumferential side reversed.
Figure 3:
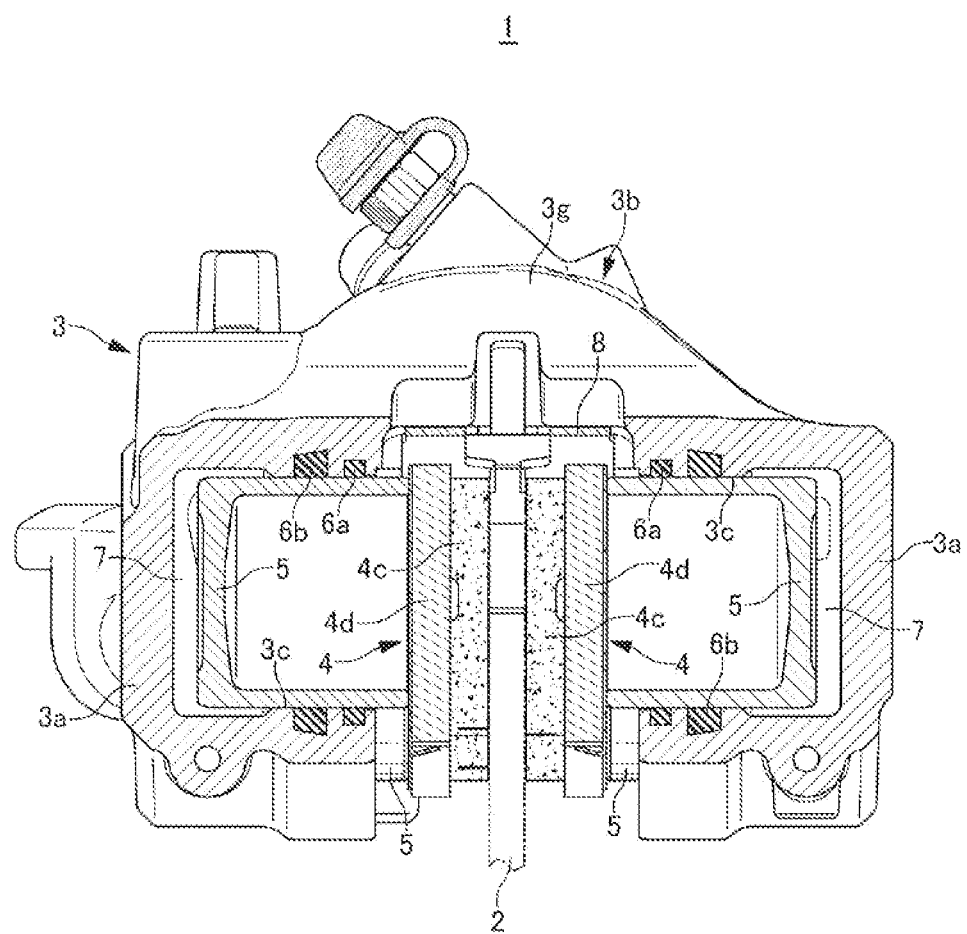
FIG. 3 is a cross sectional view taken along line in FIG. 1.

FIGS. 1 to 3 are cross sectional views illustrating a vehicle disc brake according to a first embodiment of the invention. An arrow A indicates the direction in which the disc rotor rotates together with wheels in forward travel of a vehicle and a disc exit side and a disc entry side, which will be described below, assume that the vehicle travels forward.

A vehicle disc brake 1 according to the embodiment includes a disc rotor 2 rotating together with wheels, a caliper body 3 attached to the vehicle body on one side of the disc rotor 2, and friction pads 4 and 4 disposed on both sides of the disc rotor 2.

The caliper body 3 is formed in a six-pot opposed-piston type having a monocoque structure in which a pair of acting parts 3a and 3a pushing the friction pads 4 and 4 is integrally formed with a bridge part 3b straddling the outer circumferential side of the disc rotor 2, and three cylinder holes 3c are formed in each of the acting parts 3a and 3a so as to face the three cylinder holes 3c formed in the other of the acting parts 3a and 3a. A piston 5 formed in a cup is movably inserted into each of the cylinder holes 3c so that its opening is oriented to the disc rotor 2. In each of the cylinder holes 3c, a dust seal 6a is attached to an inner circumferential part on the opening side, a piston seal 6b is attached to the part closer to the bottom of the cylinder hole than the dust seal 6a, and a hydraulic chamber 7 is defined between each of the pistons 5 and each of the cylinder holes 3c. In addition, a torque reception part 3d with which a disc exit side surface 4a and a disc entry side surface 4b of the friction pad 4 make contact is formed in the inner side in the disc radial direction of the disc rotor side surface of each of the acting parts 3a. In addition, the bridge part 3b includes a disc exit side bridge part 3e disposed on the disc exit side, a disc entry side bridge part 3f disposed on the disc entry side, and a central bridge part 3g disposed in the middle of the disc exit side bridge part 3e and the disc entry side bridge part 3f, and a pad spring 8 for pushing the friction pads 4 and 4 against the disc inner circumferential side is attached to the central bridge part 3g.

The torque reception parts 3d have four pad guide grooves 9 facing each other in each of the side parts of the disc rotor 2. Each of the pad guide grooves 9 is formed in a U-shape including a disc radial direction outer side surface 9a, a disc radial direction inner side surface 9b, and a facing surface 9c connecting the disc radial direction outer side surface 9a to the disc radial direction inner side surface 9b. In addition, a caliper side recess 9d (incorrect installation preventing part of the invention) concave toward the disc entry side and the outer side in the disc radial direction is formed in the part (close to the caliper body center) of the disc radial direction outer side surface 9a of the pad guide groove 9 on the disc entry side and a caliper side recess 9e (incorrect installation preventing part of the invention) concave toward the disc exit side and the outer side in the disc radial direction is formed in the part (close to the caliper body center) of the disc radial direction outer side surface 9a of the pad guide groove 9 on the disc exit side.

The friction pads 4 and 4 are disposed between the acting parts 3a and the disc rotor 2 and each of the friction pads 4 and 4 includes four linings 4c in slidable contact with the disc rotor 2 and a back plate 4d made of metal on which the linings 4c are pasted. The back plate 4d has a pair of tabs 10 and 11, the tab 10 protruding on the disc entry side, the tab 11 protruding on the disc exit side. A tab side protrusion 10a (incorrect installation preventing part of the invention) that is convex toward the disc entry side and the outer side in the disc radial direction and has a shape corresponding to the caliper side recess 9d is formed in the part (close to the caliper body center) of the disc radial direction outer side surface of the tab 10 on the disc entry side a tab side protrusion 11a (incorrect installation preventing part of the invention) that is convex toward the disc exit side and the outer side in the disc radial direction and corresponds to the caliper side recess 9d is formed in the part (close to the caliper body center) of the disc radial direction outer side surface of the tab 11 on the disc exit side. The friction pads 4 are supported movably in the disc axial direction by housing the tabs 10 and 11 in the pad guide grooves 9 and 9 formed in the caliper body 3 and this omits hanger pins for hanging the friction pads.

In the vehicle disc brake 1 according to the embodiment formed as described above, as illustrated in FIGS. 1 and 3, when the friction pads 4 are installed in the correct state, the tab side protrusions 10a and 11a provided on the friction pads 4 and 4 are inserted into the caliper side recesses 9d and 9e formed in the pad guide grooves 9 and 9, respectively, so the friction pads 4 and 4 can be installed to the caliper body 3 movably in the disc axial direction. In contrast, as illustrated in FIG. 2, when an attempt is made to install the friction pads 4 and 4 with the disc outer circumferential side and the disc inner circumferential side reversed by mistake, the tab side protrusions 10a and Ila make contact with the disc radial direction inner side surfaces 9b and 9b of the pad guide grooves 9 and 9 and the tabs 10 and 11 bump against the disc radial direction outer side surfaces 9a and 9a and the tabs 10 and 11 cannot be inserted into the pad guide grooves 9 and 9, thereby preventing the incorrect installation of the friction pads 4 and 4.

Figure 12:
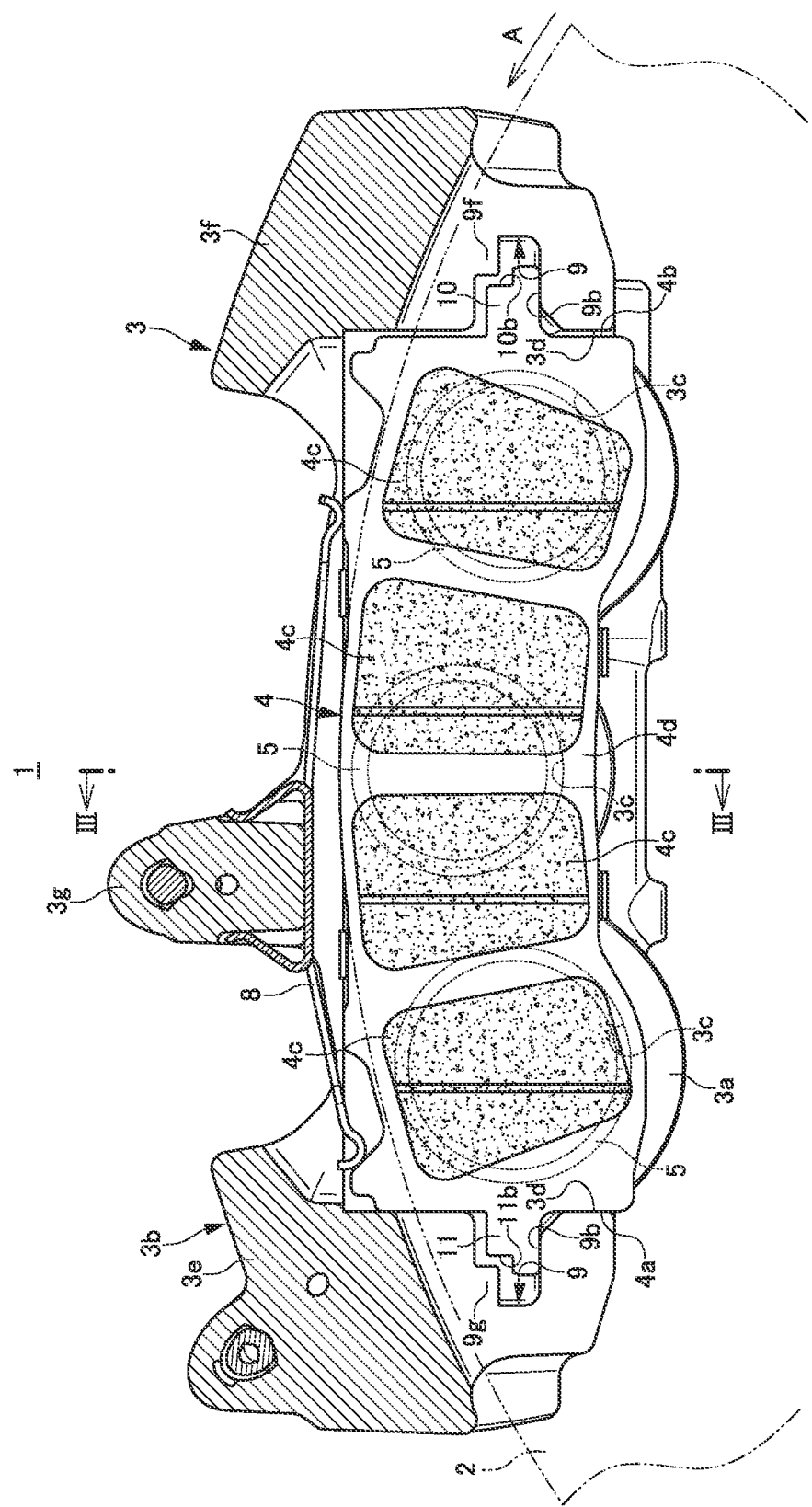
FIG. 12 is a cross sectional view illustrating a front of a vehicle disc brake according to a modified embodiment.
Figure 13:
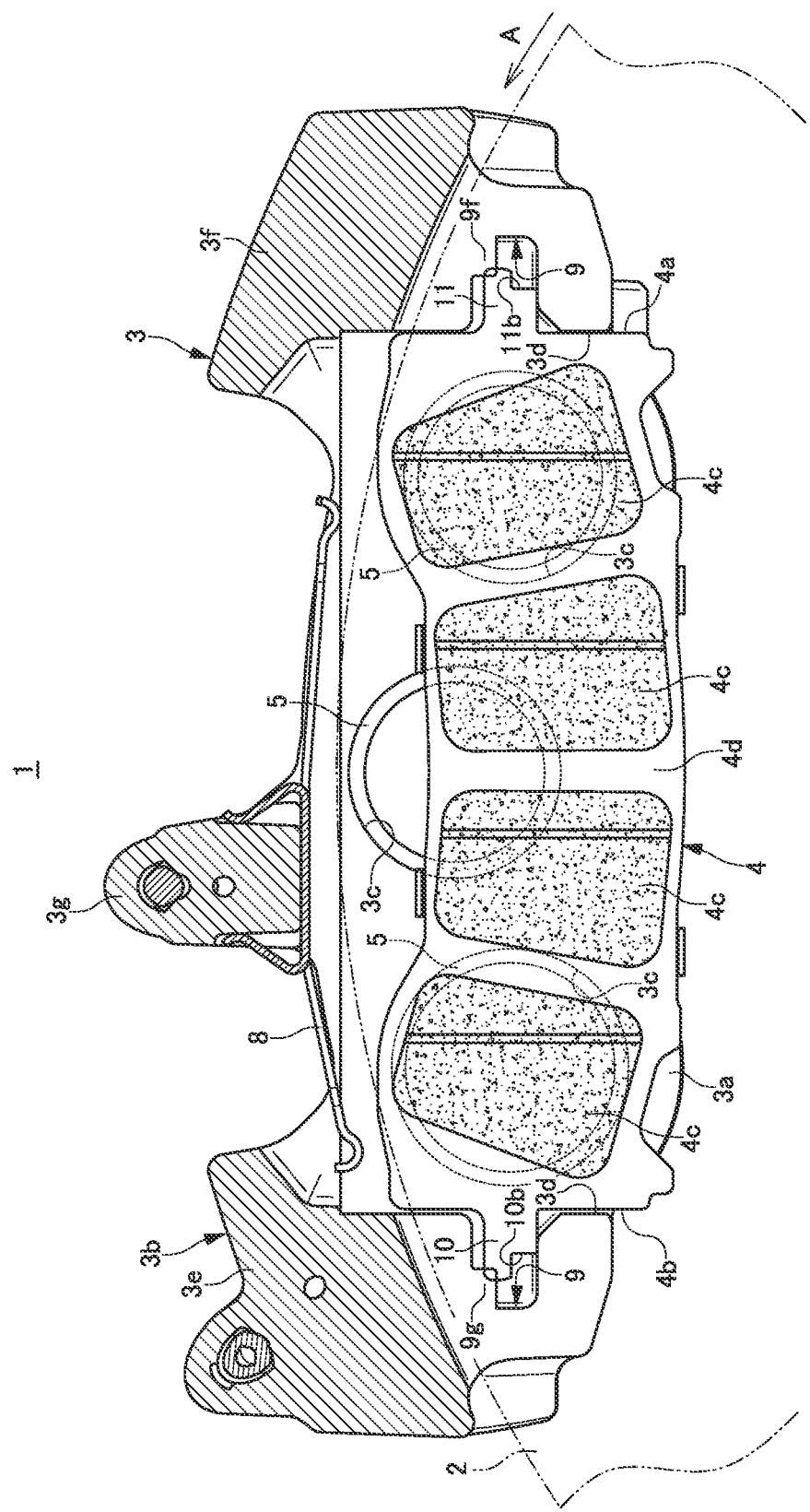
FIG. 13 is an explanatory diagram illustrating a case in which an attempt is made to install a friction pad with a disc outer circumferential side and a disc inner circumferential side reversed according to the modified embodiment.

In the above embodiment, the caliper side recesses are provided in the pad guide grooves and the tab side protrusions are provided on the tabs as the incorrect installation preventing part. Conversely, however, the caliper side protrusions 9f, 9g may be provided in the pad guide grooves and tab side recesses 10b, 11b having shapes corresponding to the caliper side protrusions may be provided in the tabs (please see, for example, FIGS. 12 and 13). In addition, recesses and protrusions as the incorrect installation preventing part may be formed in the tabs and the pad guide grooves in either the disc entry side or the disc exit side. In this case, even if an attempt is made to insert the tabs into the pad guide grooves with the front and the back of the friction pads reversed by mistake, the tabs cannot be inserted into the pad guide grooves, thereby preventing the incorrect installation of the friction pads.

Figure 4:
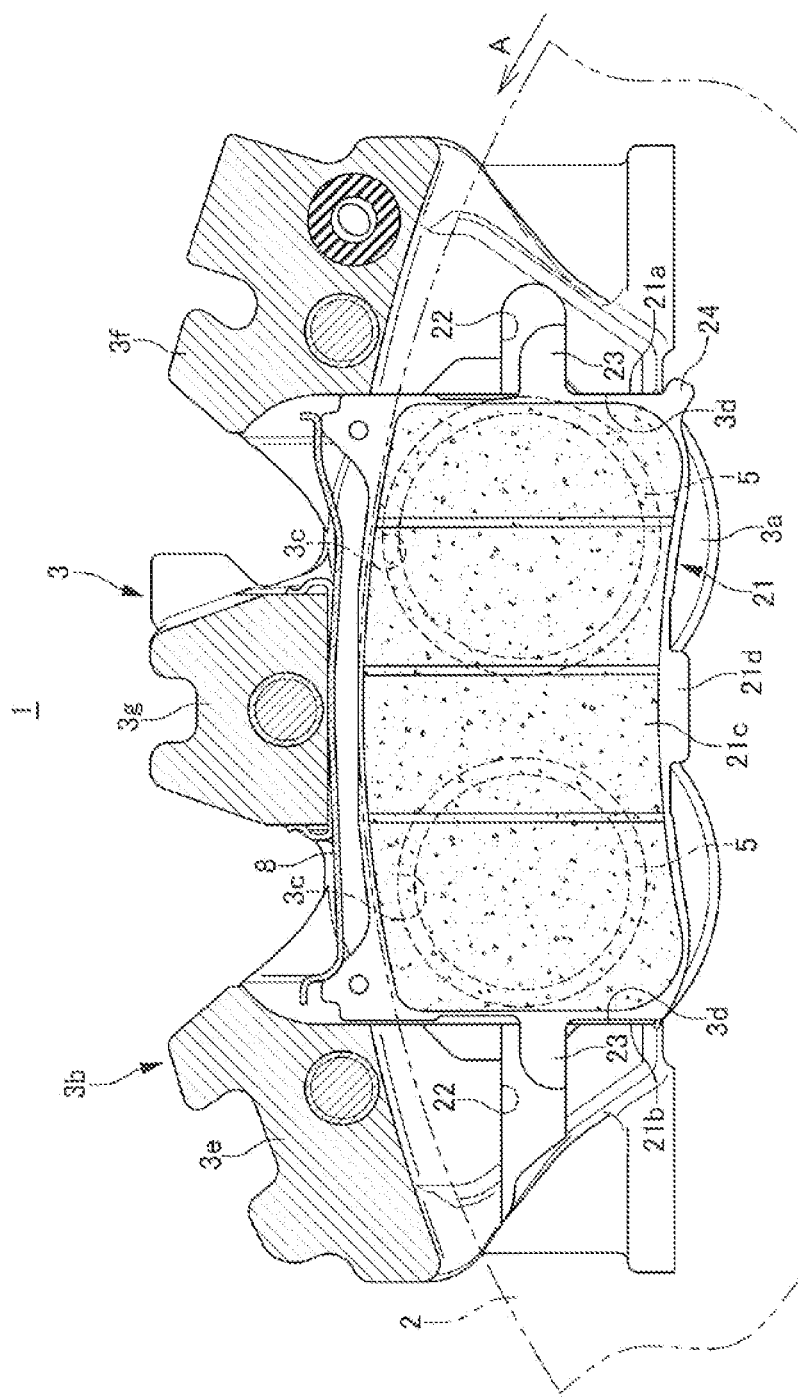
FIG. 4 is a cross sectional view illustrating the front of a vehicle disc brake according to a second embodiment of the invention.
Figure 5:
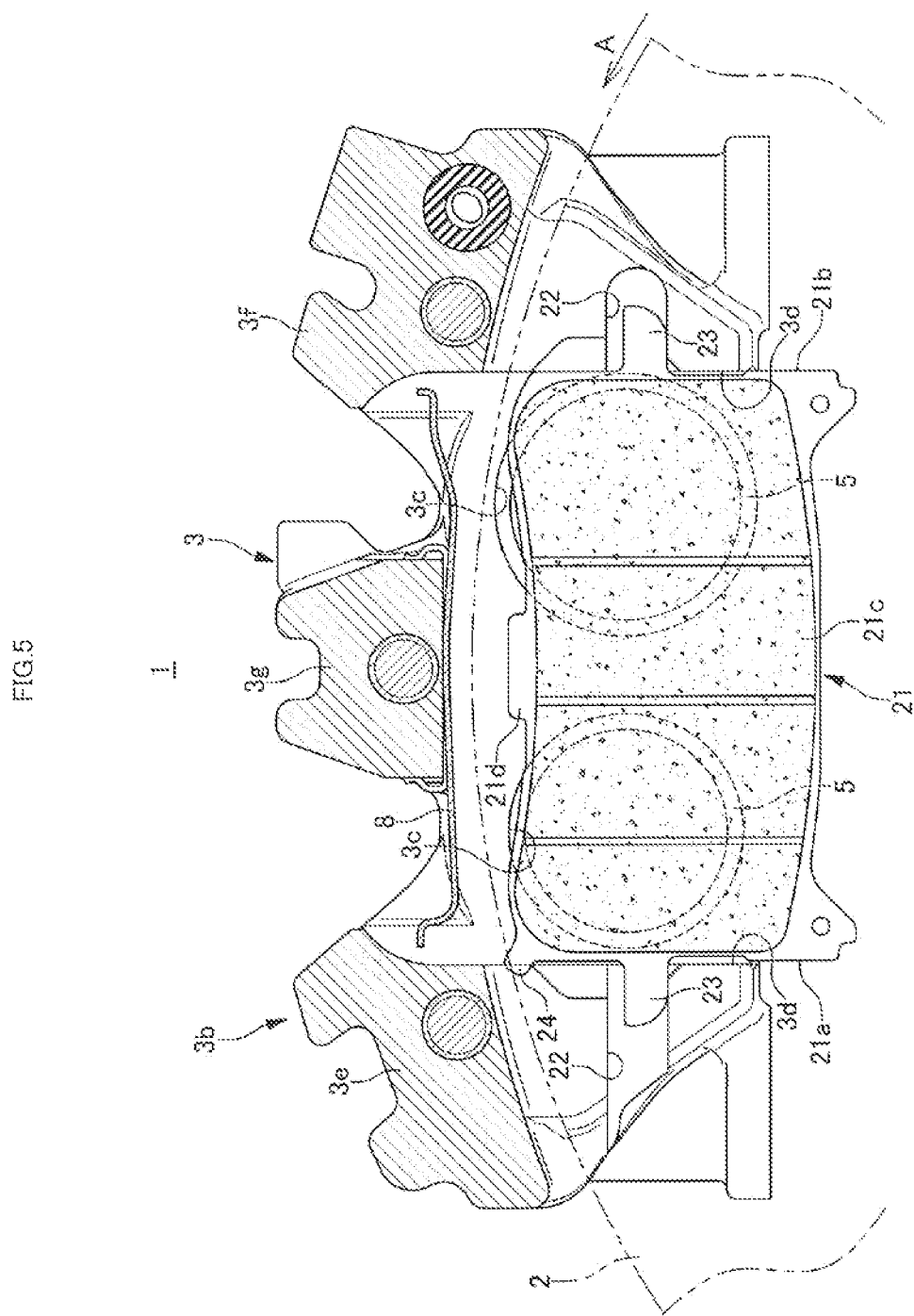
FIG. 5 is an explanatory diagram illustrating a case in which an attempt is made to install a friction pad according to the second embodiment with a disc outer circumferential side and a disc inner circumferential side reversed.

FIGS. 4 to 11 illustrate other embodiments of the invention and the same components as in the first embodiment are indicated by the same reference numerals and detailed descriptions are omitted. FIGS. 4 and 5 illustrate the second embodiment of the invention, the caliper body 3 according to the embodiment is formed by abutting the pair of acting parts 3a and 3a against each other via the bridge part 3b (this has no problem because the bridge part 3b is formed by integrating 3e, 3f, and 3g) straddling the outer circumferential side of the disc rotor 2 and coupling them with a coupling bolt, the caliper body 3 is formed in a four-pot opposed-piston type, and the two cylinder holes 3c are formed in each of the acting parts 3a and 3a so as to face each other. The piston 5 formed in a cup is movably inserted into each of the cylinder holes 3c with its opening oriented to the disc rotor 2. In addition, the torque reception part 3d with which a disc exit side surface 21b and a disc entry side surface 21a of a friction pad 21 make contact is formed on the inner side in the disc radial direction of the disc rotor side surface of each of the acting parts 3a and the torque reception part 3d is provided with four pad guide grooves 22 facing each other in the side parts of the disc rotor 2.

Each of the friction pads 21 and 21 includes a lining 21c in slidable contact with the disc rotor 2 and a back plate 21d made of metal on which the lining 21c is pasted, and a pair of tabs 23 and 23 protrude on the disc entry side and the disc exit side. In addition, a protrusion 24 (incorrect installation preventing part of the invention) protruding to the outer side in the disc rotor circumferential direction is formed at the disc radial direction inner side end of the disc entry side surface 21a of the back plate 21d.

In the embodiment, as illustrated in FIG. 4, the protrusion 24 is disposed on the inner side in the disc radial direction of the inner end in the disc radial direction of the torque reception part 3d on the disc entry side of the caliper body 3 when the friction pad 21 is installed in the correct state, and the friction pads 21 and 21 can be installed to the caliper body 3 movably in the disc axial direction by inserting the tabs 23 and 23 of the friction pads 21 into the pad guide grooves 22 and 22 of the caliper body 3. In contrast, as illustrated in FIG. 5, when an attempt is made to install the friction pads 21 and 21 with the disc outer circumferential side and the disc inner circumferential side reversed by mistake, the protrusion 24 bumps against the torque reception part 3d on the disc exit side of the caliper body and the tabs 23 and 23 cannot be inserted into the pad guide grooves 22 and 22, thereby preventing the incorrect installation of the friction pads 21 and 21.

Figure 6:
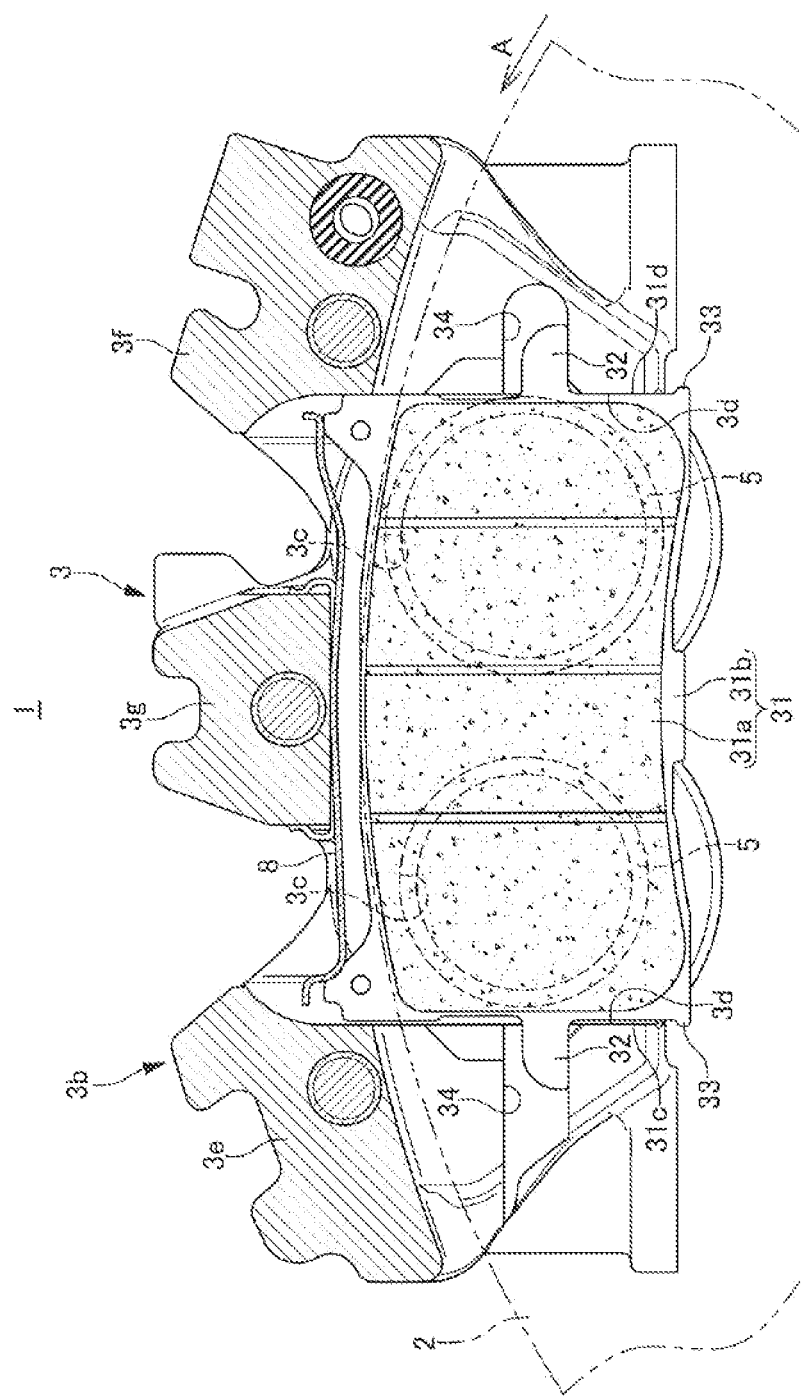
FIG. 6 is a cross sectional view illustrating the front of a vehicle disc brake according to a third embodiment of the invention.
Figure 7:
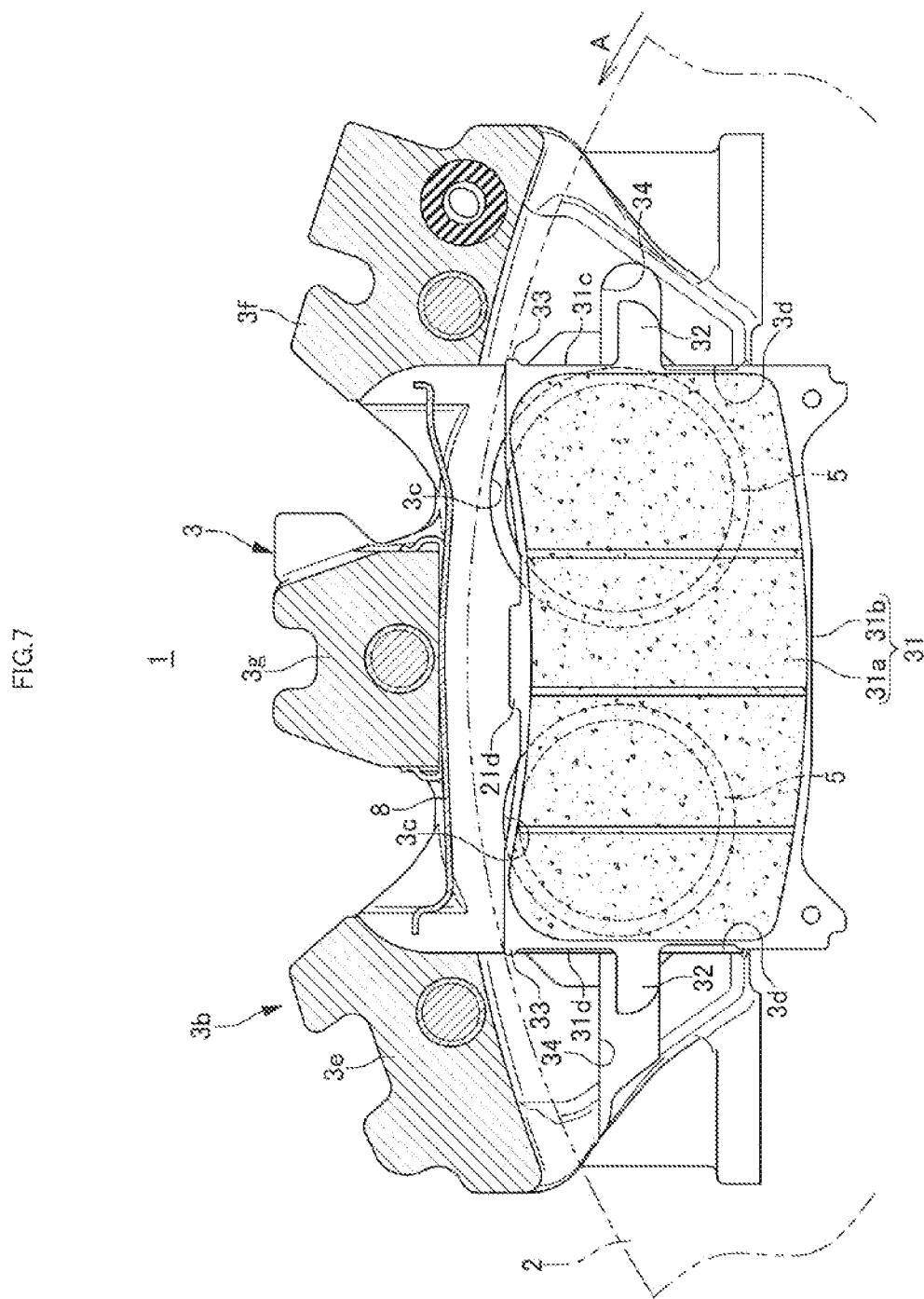
FIG. 7 is an explanatory diagram illustrating a case in which an attempt is made to install a friction pad according to the third embodiment with a disc outer circumferential side and a disc inner circumferential side reversed.

FIGS. 6 and 7 illustrate a third embodiment of the invention, a friction pad 31 according to the embodiment includes a lining 31a in slidable contact with the disc rotor 2 and a back plate 31b made of metal on which the lining 31a is pasted, and a pair of tabs 32 and 32 protrudes on the disc entry side and the disc exit side. In addition, a pair of protrusions 33 and 33 (incorrect installation preventing part of the invention) protruding to the outer side in the disc rotor circumferential direction is formed in the disc radial direction inner side end of a disc exit side surface 31c of the back plate 31b and the disc radial direction inner side end of the disc entry side surface 31d of the back plate 31b.

In the embodiment, as illustrated in FIG. 6, when the friction pad 31 is installed in the correct state, the protrusions 33 and 33 are disposed on the inner side in the disc radial direction of the disc radial direction inner side end of the both torque reception parts 3d and 3d of the caliper body 3, and the friction pads 31 and 31 can be installed to the caliper body 3 movably in the disc axial direction by inserting the tabs 32 and 32 of the friction pads 31 into pad guide grooves 34 and 34 of the caliper body 3. In contrast, as illustrated in FIG. 7, when an attempt is made to install the friction pads 31 and 31 with the disc outer circumferential side and the disc inner circumferential side reversed by mistake, the protrusions 33 and 33 bump against the both torque reception parts 3d and 3d of the caliper body 3, respectively, and the tabs 32 and 32 cannot be inserted into the pad guide grooves 34 and 34, thereby preventing the incorrect installation of the friction pads 31 and 31.

In addition, in the embodiment, even when an attempt is made to insert the tabs 32 and 32 into the pad guide grooves 34 and 34 with the disc outer circumferential side and the disc inner circumferential side of the friction pads 31 and 31 revered and the tabs 32 and 32 inclined obliquely with respect to the caliper body 3, any of the protrusions 33 and 33 bumps against the caliper body 3 and incorrect installation can be surely prevented. In addition, since the pair of protrusions 33 and 33 provided in the friction pad 31 protrudes to the outer side in the disc rotor circumferential direction, the height of the protrusions 33 can be suppressed and the amount of exposure of the protrusions 33 and 33 from the caliper body 3 can be reduced as compared with the protrusions 24 of the second embodiment, so the appearance can be kept good by making the protrusions 33 and 33 inconspicuous.

Figure 8:
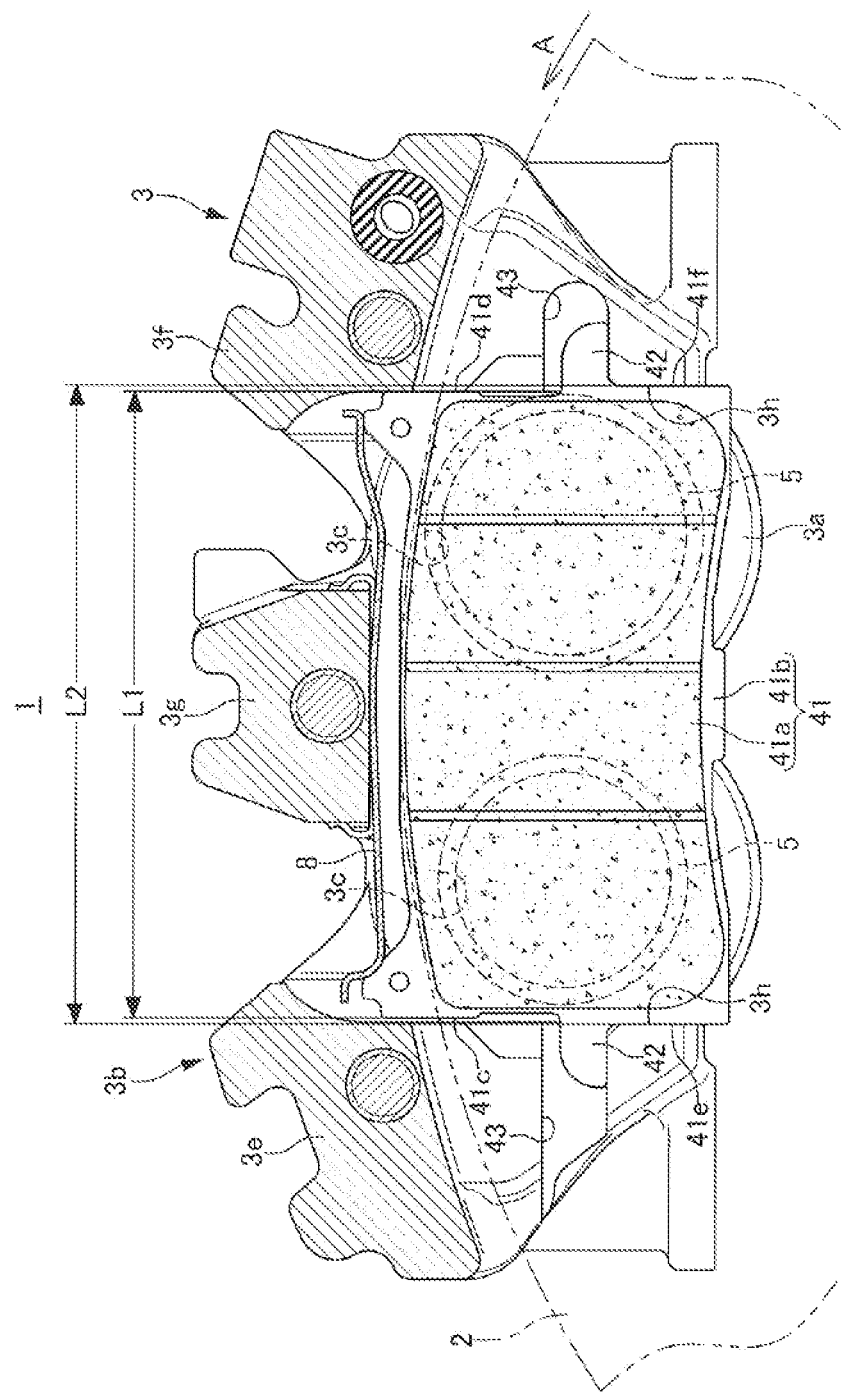
FIG. 8 is a cross sectional view illustrating the front of a vehicle disc brake according to a fourth embodiment of the invention.
Figure 9:
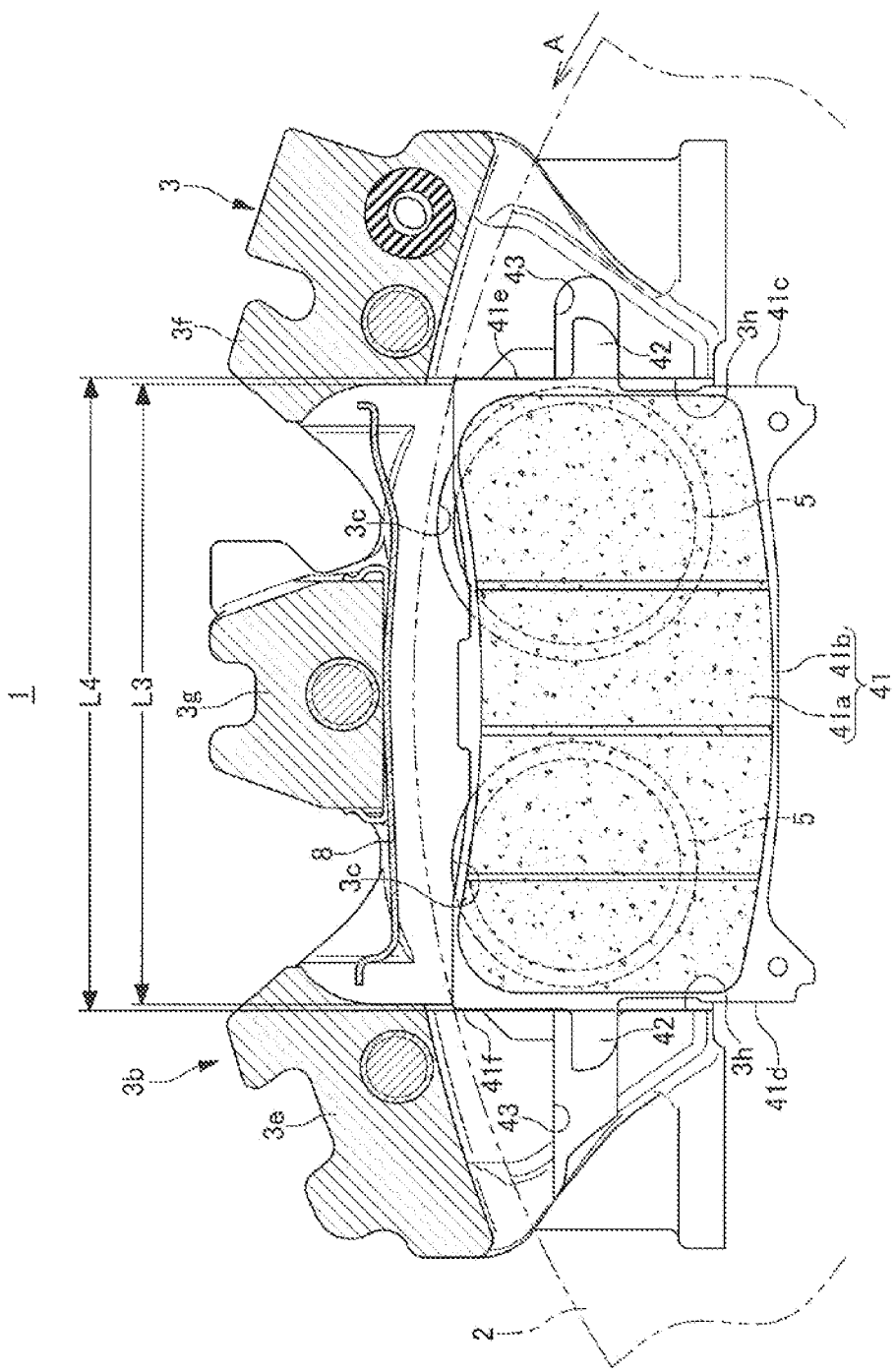
FIG. 9 is an explanatory diagram illustrating a case in which an attempt is made to install a friction pad according to the fourth embodiment with a disc outer circumferential side and a disc inner circumferential side reversed.

FIGS. 8 and 9 illustrate a fourth embodiment of the invention and a friction pad 41 according to the embodiment includes a lining 41a in slidable contact with the disc rotor 2 and a back plate 41b made of metal on which the lining 41a is pasted, and a pair of tabs 42 and 42 protrudes on the disc entry side and the disc exit side. In addition, the back plate 41b is formed so that a width L1 from a disc exit side surface 41c to a disc entry side surface 41d on the outer side in the disc radial direction of the tabs 42 and 42 is smaller than a width L2 from a disc exit side surface 41e to a disc entry side surface 41f on the inner side in the disc radial direction.

Torque reception parts 3h and 3h provided in the acting parts 3a and 3a of the caliper body 3 have pad guide grooves 43 and 43 in the intermediate part in the disc radial direction and are formed in a step in which the length L3 between the torque reception parts 3h and 3h, facing each other across the friction pad 41, that are disposed on the outer side in the disc radial direction of the pad guide grooves 43 and 43 are smaller than the length L4 between the torque reception parts 3h and 3h, facing each other across the friction pad 41, that are disposed on the inner side in the disc radial direction of the pad guide grooves 43 and 43 depending on the shape of the back plate 41b.

In the embodiment, as illustrated in FIG. 8, when the friction pad 41 is installed in the correct state, a small width part on the outer side in the disc radial direction of the tabs 42 and 42 of the back plate 41b is disposed in the part having a short length between the torque reception parts 3h and 3h and a wide width part on the inner side in the disc radial direction of the tabs 42 and 42 is disposed in the part having a long length between the torque reception parts 3h and 3h, so that the friction pads 41 and 41 can be installed to the caliper body 3 movably in the disc axial direction by inserting the tabs 42 and 42 into the pad guide grooves 43 and 43. In contrast, as illustrated in FIG. 9, when an attempt is made to install the friction pads 41 and 41 with the disc outer circumferential side and the disc inner circumferential side reversed by mistake, a large width part between the disc exit side surface 41*e* and the disc entry side surface 41*f* of the back plate 41*b* bumps against the part of the caliper body 3 having a small length between the torque reception parts 3*h* and 3*h* and the tabs 42 and 42 cannot be inserted into the pad guide grooves 43 and 43, thereby preventing the incorrect installation of the friction pads 41 and 41.

In the invention, the width from the disc exit side surface to the disc entry side surface on the inner side in the disc radial direction of the tabs of the back plates of the friction pads may be smaller than the width from the disc exit side surface to the disc entry side surface on the outer side in the disc radial direction of the tabs and, depending on the shapes of the back plates, the length between the torque reception parts facing each other across the friction pads on the inner side in the disc radial direction of the pad guide grooves may be smaller than the length between the torque reception parts facing each other across the friction pads on the outer side in the disc radial direction of the pad guide grooves to form a step.

Figure 10:
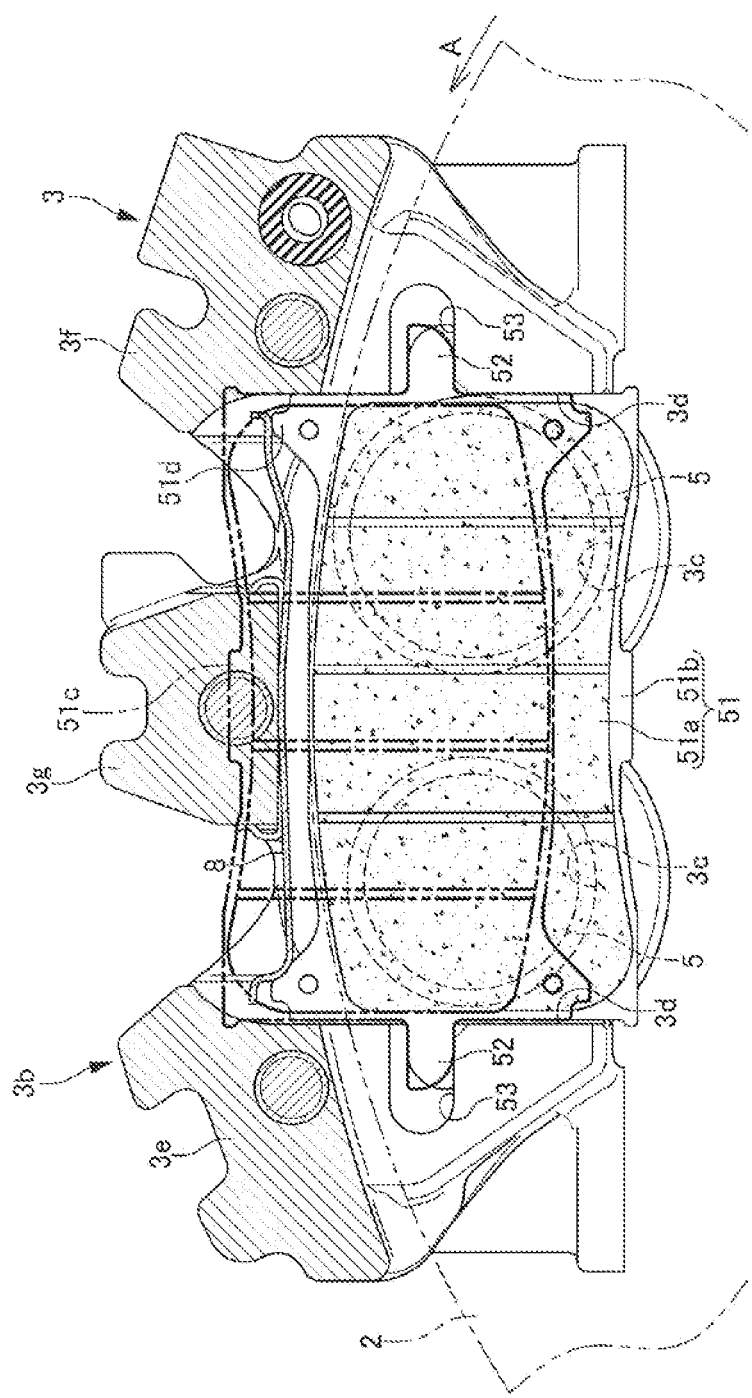
FIG. 10 is a cross sectional view illustrating the front of the vehicle disc brake according to the fourth embodiment of the invention.
Figure 11:
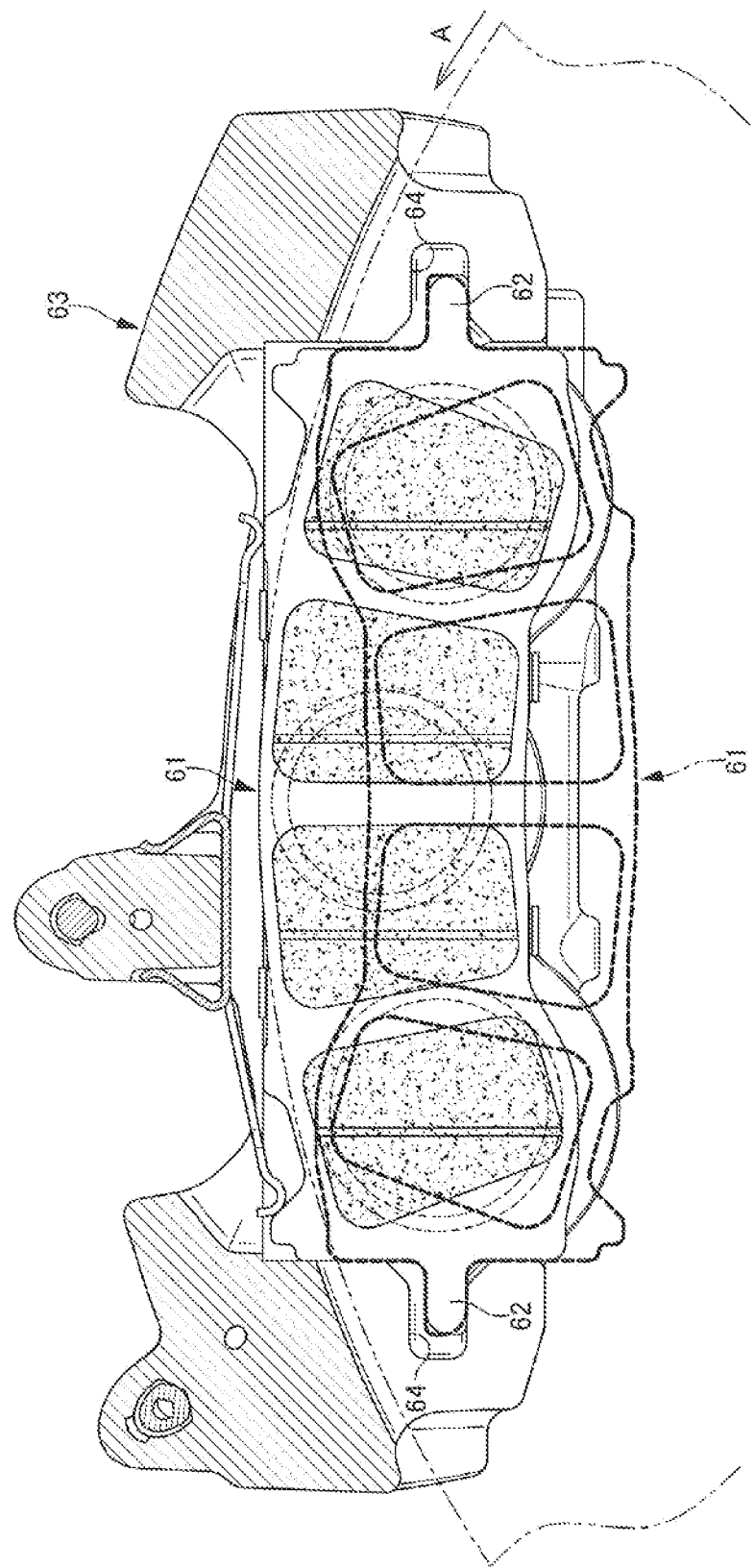
FIG. 11 is an explanatory diagram illustrating a conventional vehicle disc brake.

FIG. 10 indicates a fifth embodiment of the invention, a friction pad 51 according to the embodiment includes a lining 51*a* in slidable contact with the disc rotor 2 and a metal back plate 51*b* on which the lining 51*a* is pasted, and a pair of tabs 52 and 52 protrudes on the disc entry side and the disc exit side.

The positions in which the tabs 52 and 52 are formed and the positions of pad guide grooves 53 and 53 formed in the torque reception parts 3*d* and 3*d* are determined so that a disc radial direction inner side surface 51*c* of the friction pad 51 bumps against the central bridge part 3*g* of the caliper body 3 when the friction pad 51 is installed with the disc inner circumferential side and the disc outer circumferential side reversed by mistake and the tabs 52 and 52 are formed on the outer side in the disc radial direction of the back plate 51*b* of the friction pad 51 and the pad guide grooves 53 and 53 are formed on the outer side in the disc radial direction of the torque reception part 3*d* and 3*d*.

In addition, the positions in which the tabs 52 and 52 and the pad guide grooves 53 and 53 are formed may be present on the inner side in the disc radial direction to which a disc radial direction outer side surface 51*d* of the friction pad 51 protrudes from the disc inner circumferential side of the caliper body 3 when the friction pad 51 is installed with the disc inner circumferential side and the disc outer circumferential side reversed by mistake. In this case, since the friction pads are visually identified from the disc inner circumferential side of the caliper body 3 in the case of incorrect installation, incorrect installation can be prevented.

The invention is not limited to the above embodiments, which are of six-pot or four-pot opposed-piston type, and applicable to two-pot or eight-or-more-pot opposed piston type. In addition, the invention is applicable regardless of the structure of a caliper body or a friction pad as long as friction pads can be installed to the caliper body movably in the disc axial direction by inserting the tabs of the friction pads into the pad guide grooves of the caliper body.

REFERENCE SIGNS LIST

1: vehicle disc brake
2: disc rotor
3: caliper body
3*a*: acting part
3*b*: bridge part
3*c*: cylinder hole
3*d*, 3*h*: torque reception part
3*e*: disc exit side bridge part
3*f*: disc entry side bridge part
3*g*: central bridge part
4: piston
4*a*: disc exit side surface
4*b*: disc entry side surface
4*c*: lining
4*d*: back plate
5: piston
6*a*: dust seal
6*b*: piston seal
7: hydraulic chamber
8: pad spring
9: pad guide groove
9*a*: disc radial direction outer side surface
9*b*: disc radial direction inner side surface
9*c*: facing surface
9*d*, 9*e*: caliper side recess
10, 11: tab
10*a*, 11*a*: tab side protrusion
21: friction pad
21*a*: disc entry side surface
21*b*: disc exit side surface
21*c*: lining
21*d*: back plate
22: pad guide groove
23: tab
24: protrusion
31: friction pad
31*a*: lining
31*b*: back plate
31*c*: disc exit side surface
31*d*: disc entry side surface
32: tab
33: protrusion
34: pad guide groove
41: friction pad
41*a*: lining
41*b*: back plate
41*c*, 41*e*: disc exit side surface
41*d*, 41*f*: disc entry side surface
42: tab
43: pad guide groove
51: friction pad
51*a*: lining
51*b*: back plate
51*c*: disc radial direction inner side surface
51*d*: disc radial direction outer side surface
52: tab
53: pad guide groove

What is claimed is:

1. A vehicle disc brake comprising:
    a caliper body provided with an acting part having a cylinder hole open toward a disc rotor; and
    a pair of friction pads disposed on both sides of the disc rotor, each of the friction pads having a pair of tabs on a disc entry side and a disc exit side of a back plate in forward travel of a vehicle, the friction pads being supported movably in a disc axial direction by housing the tabs in pad guide grooves formed in the caliper body,
    wherein an incorrect installation preventing part is provided so as to prevent incorrect installation by bumping against the caliper body or the tabs when the friction pads are installed in the pad guide grooves in an incorrect orientation, and wherein the incorrect installation preventing part is formed by:
- a caliper side recess or a caliper side protrusion formed in at least one of the pad guide grooves and
- a tab side protrusion having a shape corresponding to the caliper side recess or a tab side recess having a shape corresponding to the caliper side protrusion formed in at least one of the tabs corresponding to the at least one of the pad guide grooves, and, when the friction pads are installed in the incorrect orientation, the caliper side protrusion bumps against the at least one of the tabs or the tab side protrusion bumps against the at least one of the pad guide grooves.

\* \* \* \* \*